(12) United States Patent
Foote et al.

(10) Patent No.: US 10,365,487 B1
(45) Date of Patent: Jul. 30, 2019

(54) NIGHT SKY SPATIAL ORIENTATION USING COLOR AND SURFACE FUSION

(71) Applicants: Bobby D. Foote, Marion, IA (US); Johnathan C. Lewis, Center Point, IA (US); David C. Barnes, Southlake, TX (US); Robert C. McKillip, Cedar Rapids, IA (US); David W. Jensen, Marion, IA (US)

(72) Inventors: Bobby D. Foote, Marion, IA (US); Johnathan C. Lewis, Center Point, IA (US); David C. Barnes, Southlake, TX (US); Robert C. McKillip, Cedar Rapids, IA (US); David W. Jensen, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 707 days.

(21) Appl. No.: 14/747,633

(22) Filed: Jun. 23, 2015

(51) Int. Cl.
| | |
|---|---|
| H04N 7/18 | (2006.01) |
| G02B 27/01 | (2006.01) |
| H04N 5/33 | (2006.01) |
| H04N 5/225 | (2006.01) |
| H04N 9/097 | (2006.01) |

(52) U.S. Cl.
CPC ....... *G02B 27/0172* (2013.01); *H04N 5/2258* (2013.01); *H04N 5/33* (2013.01); *H04N 9/097* (2013.01); *G02B 2027/014* (2013.01); *G02B 2027/0178* (2013.01)

(58) Field of Classification Search
CPC .......... G02B 27/0172; G02B 2027/014; G02B 2027/0178; H04N 5/2258; H04N 5/33; H04N 9/097

USPC .......... 348/115; 345/8, 617; 359/630; 703/6; 250/207; 351/211; 244/181; 358/482
See application file for complete search history.

(56) References Cited

U.S. PATENT DOCUMENTS

| | | | | |
|---|---|---|---|---|
| 5,907,414 A | * | 5/1999 | Hiratsuka | ................. H04N 1/58 358/482 |
| 6,195,206 B1 | * | 2/2001 | Yona | .................... G02B 23/125 359/630 |
| 6,693,559 B1 | * | 2/2004 | Gyde | .................... B64D 43/00 244/181 |
| 8,724,894 B1 | | 5/2014 | Jensen et al. | |
| 2002/0101568 A1 | * | 8/2002 | Eberl | ................... G02B 27/017 351/211 |

(Continued)

*Primary Examiner* — Jayanti K Patel
*Assistant Examiner* — Richard B Carter
(74) *Attorney, Agent, or Firm* — Donna P. Suchy; Daniel M. Barbieri

(57) ABSTRACT

A method of operating an optical system is described. An image is detected. A digital image signal based on a spatially varying luminance level of the detected image is received. Horizon data, separate from the digital image signal, indicating the position of a horizon where a sky is adjacent the horizon, is received. The position of the horizon is determined based on the received horizon data. A fused image signal is provided based on the received digital image signal and the determined position of the horizon where a sky region indicative of the sky is provided with an enhanced color fused with the varying luminance level of the detected image. A full color display displays a fused image based on the fused image signal. A corresponding optical system is also described.

16 Claims, 3 Drawing Sheets

(56) References Cited

U.S. PATENT DOCUMENTS

| | | | |
|---|---|---|---|
| 2007/0084985 A1* | 4/2007 | Smith | G02B 23/125 250/207 |
| 2015/0100291 A1* | 4/2015 | Mrozowicz | G06F 17/5009 703/6 |
| 2016/0093034 A1* | 3/2016 | Beck | G06T 5/50 345/617 |

* cited by examiner

NIGHT SKY SPATIAL ORIENTATION USING COLOR AND SURFACE FUSION

BACKGROUND

The inventive concepts disclosed herein relate generally to the field of night vision optical systems, and in particular digital night vision goggles.

Aircraft pilots may wear night vision goggles when operating aircraft at night. One issue with such systems is the difficulty for a pilot in recognizing the transition at the horizon to the sky in low light level environments, such as in overcast night environments. If a pilot does not easily recognize the transition at the horizon to the sky, the pilot may lose spatial orientation, which could potentially result in a pilot crashing the aircraft. This is especially true when flying with night vision at low altitudes over the ocean.

Current analog night vision goggles can only produce a green display with little or no contrast between the sky and ocean at the horizon. Some systems provide a blue color for the sky cues by pasting a blue image of a sky on an image for standard night vision goggles. This approach, however, does not include surface information, such as clouds or other aircraft in the sky, and results in significant loss of visual acuity. These optical approaches are also limited to the central 20° of the display.

SUMMARY

In one aspect, embodiments of the inventive concepts disclosed herein are directed to a night vision optical system having a plurality of components. At least one digital image sensor channel is configured to detect an image. At least one processor is configured to perform functions as follows. A digital image sensor signal is received from the at least one digital image sensor channel based on a spatially varying luminance level of the detected image. Horizon data, separate from the digital image sensor signal from the at least one digital image sensor channel, is received indicating the position of a horizon where a sky is adjacent the horizon. The position of the horizon based on the received horizon data is determined. A fused image signal is provided based on the received digital image sensor signal and the determined position of the horizon where a sky region indicative of the sky is provided with an enhanced color fused with the varying luminance level of the detected digital sensor image. A full color display is configured to display a fused image based on the fused image signal received from the at least one processor.

In some embodiments, the at least one digital image sensor channel comprises at least one digital NIR sensor channel.

In some embodiments, the at least one digital image sensor channel comprises two digital image sensor channels, and the night vision optical system comprises night vision goggles.

In some embodiments, the digital image received from the at least one digital image sensor channel is for a monochrome image.

In some embodiments, the full color display has an array of pixels, and the at least one processor is configured to provide each pixel individually with a signal based on fusing the luminance level of the enhanced color and the luminance level of the detected image at a respective pixel.

In some embodiments, the horizon data is based on aircraft orientation data indicating an orientation of an aircraft, and helmet tracked orientation data indicating the orientation of a helmet of an occupant with respect to the aircraft.

In some embodiments, the horizon is provided as a substantially straight line.

In some embodiments, the horizon data is further based on topology data of the earth at the longitudinal and latitudinal position of the aircraft and based on heading data indicative of the heading of the aircraft.

In some embodiments, the horizon is provided as an irregularly shaped line.

In some embodiments, the enhanced color is blue.

In another aspect, embodiments of the inventive concepts disclosed herein are directed to method of operating a night vision optical system. The method includes a number of steps. An image is detected. A digital image signal based on a spatially varying luminance level of the detected image is received. Horizon data, separate from the digital image signal, indicating the position of a horizon where a sky is adjacent the horizon, is received. The position of the horizon is determined based on the received horizon data. A fused image signal is provided based on the received digital image signal and the determined position of the horizon where a sky region indicative of the sky is provided with an enhanced color fused with the varying luminance level of the detected image. A full color display displays a fused image based on the fused image signal.

In some embodiments, the night vision optical system comprises night vision goggles.

In some embodiments, the enhanced color is blue.

In some embodiments, the received digital image is for a monochrome image.

In some embodiments, the full color display has an array of pixels, and the method includes providing each pixel individually with a signal based on fusing the luminance level of the enhanced color and the luminance level of the detected image at a respective pixel.

In some embodiments, the horizon data is based on aircraft orientation data indicating an orientation of an aircraft, and helmet tracked orientation data indicating the orientation of a helmet of an occupant with respect to the aircraft.

In some embodiments, the horizon is provided as a substantially straight line.

In some embodiments, the horizon data is further based on topology data of the earth at the longitudinal and latitudinal position of the aircraft and based on heading data indicative of the heading of the aircraft.

In some embodiments, the horizon is provided as an irregularly shaped line.

DETAILED DESCRIPTION

According to certain inventive concepts described herein, digital night vision goggles (DNVG) are used with processing to artificially color the night sky, but at the same time maintain the surface data, such as clouds, and other aircraft. The blue sky and the detected image from the goggles are combined at a pixel-by-pixel level, instead of merely pasting a blue sky over a region of the image. This will result in a realistic sky that provides the pilot with immediate cues as to the spatial orientation of the aircraft, but at the same time surface data is present in the view of the sky.

By coloring a sky region with an enhanced color, and fusing with the luminance levels from digital image sensor channels, such as in the near infrared (NIR), a pilot may easily determine the spatial orientation of the aircraft without losing any features such as clouds, stars or other aircraft. Using this approach provides a clear unobstructed view of the world while providing the night sky cue and preventing spatial disorientation.

Versions of DNVG may use various image sensors to detect light in different wavelengths, and are not limited to any particular wavelength range. The DNVGs may sense light from the visible through the NIR, for example. The innovative concepts described in this application further readily apply to DNVGs using sensors detecting other wavelengths such as ultraviolet (UV), short wave infrared (SWIR), long wave infrared (LWIR), and millimeter wave (mmW). While the innovative concepts are described below using near infrared (NIR), other wavelengths are appropriate.

Figure 1:
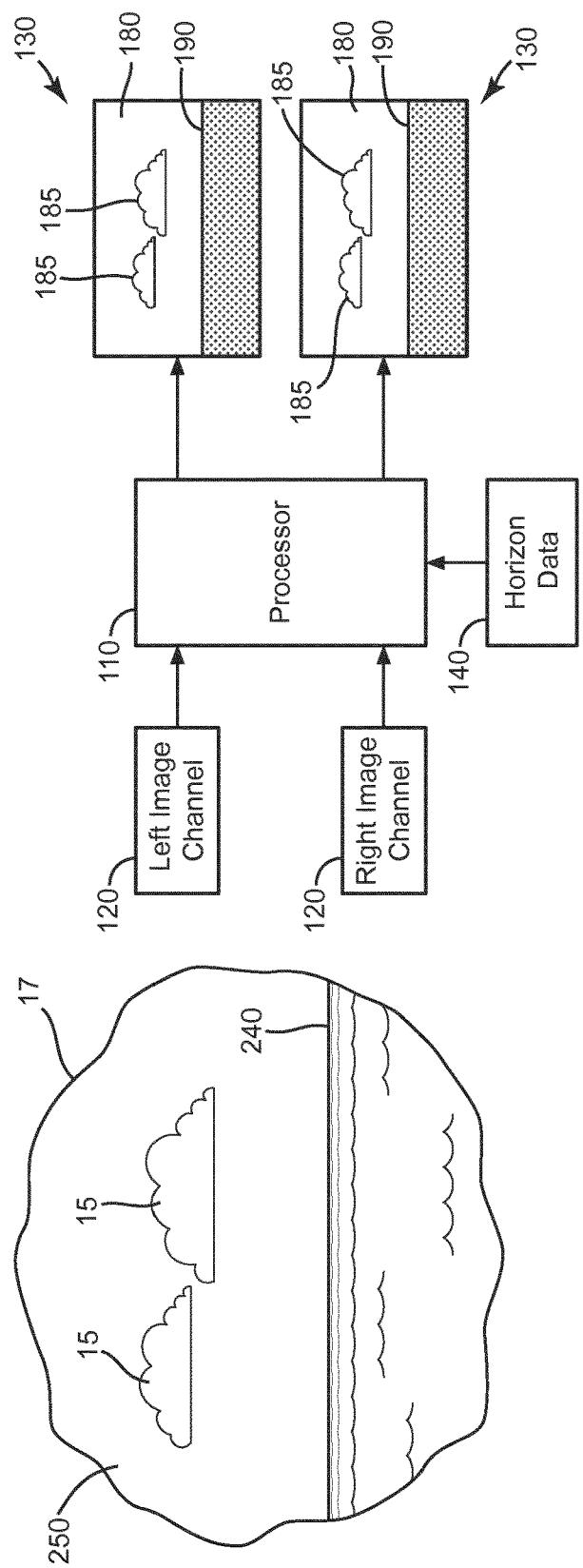
FIG. 1 is a schematic illustrating a night vision optical system according to an embodiment of the inventive concepts disclosed herein.
Figure 2:
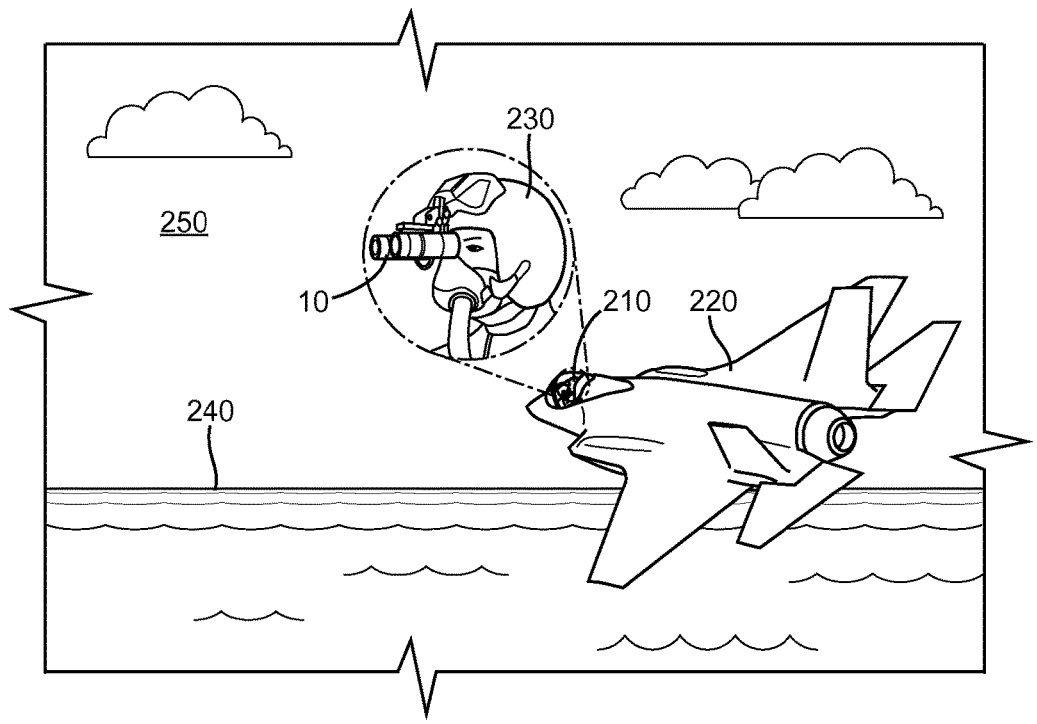
FIG. 2 is a schematic illustrating the night vision optical system of FIG. 1 in an aircraft environment.

FIG. 1 illustrates a night vision optical system 10 according to an embodiment. FIG. 2 illustrates a night vision optical system 10 in an environment where an occupant 210, such as a pilot, of an aircraft 220 is wearing the night vision optical system 10 along with a helmet 230. FIG. 2 further illustrates the aircraft 220 in an environment with a horizon 240 and a sky 250 adjacent to the horizon 240.

Returning to FIG. 1, the night vision optical system 10 includes at least one processor 110, at least one digital image sensor channel 120, and a full color display 130.

The digital image sensor channel 120 may be configured to detect a NIR image, such as an image of a scene 17 in front of the digital image sensor channel 120, where the scene 17 includes objects 15. In this regard, the digital image sensor channel 120 may detect NIR radiation emitted from the scene 17 including the objects 15. In particular, the digital image sensor channel 120 detects luminance from the objects 15 in the scene 17. In general, the image of the scene 17 will have spatially varying luminance levels across the scene 17. For example, for an object 15, such as a cloud or another aircraft for example, the object 15 may emit NIR radiation, while another region of the scene 17 may have no object and emit no NIR radiation, or another region of the scene 17 may emit a larger amount of NIR radiation. Thus, the image of the scene 17 will have larger luminance values for regions of the scene 17 emitting a larger amount of NIR radiation, and in general the image of the scene 17 will have spatially varying luminance. The digital image sensor channel 120 may provide a monochrome image, for example.

While the night vision optical system 10 shown in FIG. 1 illustrates two digital image sensor channels 120, the number of digital image sensor channels 120 may be one, or may be more than two, for example. In the case that the number of digital image sensor channels 120 is two, the night vision optical system 10 may be night vision goggles. In this regard, the digital image sensor channels 120 themselves may be conventional NIR image channels of night vision googles. The digital image sensor channels 120 may include a left image channel and a right image channel arranged to provide an NIR image for a left eye and a right eye, respectively, on an operator wearing the night vision googles.

The processor 110 is configured to receive a digital image sensor signal from the at least one digital image sensor channel 120 based on the spatially varying luminance level of the detected NIR image. The processor 110 is further configured to provide signal processing on the received digital image signal. The processor 110 may be a specialized processor configured to perform the specific signal processing procedures. The processor 110 may include a memory to store data corresponding to the signal processing performed by the processor 110. The processor 110 may be programmed or otherwise structured to perform the specific signal processing procedures.

The processor 110 is configured to receive horizon data 140, separate from the digital image sensor signal from the at least one digital image sensor channel 120, indicating the position of a horizon 240 where a sky 250 is above the horizon 240. The processor 110 is also configured to determine the horizon position based on the received horizon data 140. The processor 110 is further configured to provide a fused image signal based on the received digital image sensor signal and the received horizon data 140 where a sky region 180 of the image indicative of the sky is provided with an enhanced color fused with the varying luminance level of the detected NIR image.

The fused imaging may be performed based on combining the luminance levels of the enhanced color in the sky region 180 and the spatially varying luminance levels of the detected NIR image. Fused imaging is described, for example, in U.S. Pat. No. 8,724,894, entitled "COLORIZATION OF DIGITAL IMAGERY" issued on May 13, 2014, which is incorporated by reference in its entirety. U.S. Pat. No. 8,724,894 describes fusion of high resolution monochrome images with low resolution color sources. The enhanced color corresponding to the sky region 180 may be a blue color and used as the color source, for example. As described in U.S. Pat. No. 8,724,894, the enhanced color may be expressed in terms of CIE (Commission on Illumination) color coordinates u', v', for example, and will have a set luminance $L^*(u',v')$ at those coordinates. Each $L^*$ value is coupled with each color red, green, and blue mosaic, and then demosaiced for presentation to the user. Multiple colors can be chosen to further enhance the image by providing color above and below the defined horizon. Colors can be desaturated depending on the luminance value, such as when clouds are present as objects in the sky, to provide whiter clouds over a bluer sky.

An extension of the enhanced color approach described above is to use edge detection algorithms that better define the real world horizon and details such as clouds and other objects of interest in the color enhanced area. Examples of conventional edge detection algorithms include Canny and Sobel algorithms. A preferred filter uses the high frequency of digital wavelet transform (DWT) functions to identify and colorize edges. This provides the definition of the edges and further defines the spatial area for enhanced color.

While the luminance of the enhanced color is fixed across the sky region 180 of the image, the luminance level of the detected NIR image will be spatially varying due to objects 185 in the NIR image. Thus, fusing the enhanced color image will provide a color cue in the sky region 180, while at the same time will display objects 185 in the fused image in the sky region. Thus, a pilot viewing the night sky via the night vision optical system 10, will have the visual color cue of the sky region 180, with its horizon 190, to prevent pilot disorientation, while at the same time will have visuals of objects 185 in the sky region 180, such as clouds, stars, or other aircraft.

The horizon data 140 indicates the position of a horizon 240 where the sky 150 is adjacent the horizon 240, and may depend on the particular environment and the type of aircraft where the night vision optical system 10 will be deployed.

The full color display 130 displays a fused image based on the fused image signal received from the at least one processor 110. The full color display includes an array of pixels to provide full color in each pixel.

Figure 3:
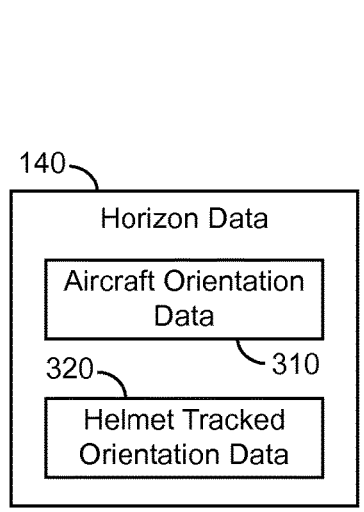
FIG. 3 illustrates horizon data according to an embodiment of the inventive concepts disclosed herein.

FIG. 3 illustrates the horizon data 140 which may be appropriate for fixed wing aircraft in flights over an ocean, where the horizon 240 is expected to be substantially a straight line. In this case the horizon 240 will be presumed to be substantially a straight line. The horizon data 140 includes aircraft orientation data 310 and helmet tracked orientation data 320.

The aircraft orientation data 310 is data indicating the orientation of the aircraft 220 relative to the earth. The aircraft orientation data 310 may be provided by aircraft systems in the aircraft 220, for example, as is known.

The helmet tracked orientation data 320 is data indicating the orientation of a helmet 230 of an occupant 210 within the aircraft 220 employing the night vision optical system 10, such as a pilot flying the aircraft 220, relative to the aircraft 220. The processor 110 may then determine the orientation of the helmet 230, and presumably the orientation of the aircraft occupant 210 wearing the helmet 230, relative to the earth, based on the helmet tracked orientation data 320, and the aircraft orientation data 310.

The processor 110 may then determine from the horizon data 140, the location of the horizon 180 on the image, based on the orientation of the helmet 230, and presumably the orientation of the aircraft occupant 210 wearing the helmet 230, relative to the earth. The processor 110 then sets the sky region 180 to be the region in the image which is adjacent the horizon 190.

Determining the horizon 190 as a substantially flat line based on the aircraft orientation data 310 and the helmet tracked orientation data 320 is appropriate for environments such as where fixed aircraft are above the ocean.

Figure 4:
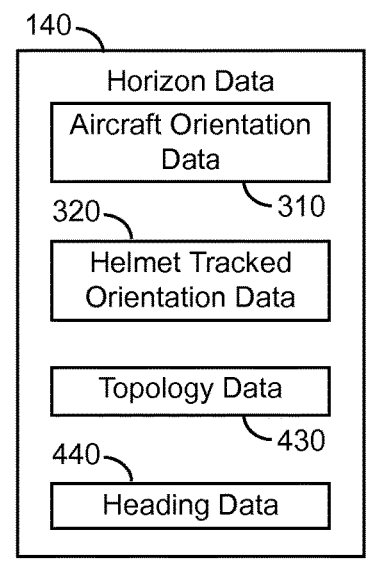
FIG. 4 illustrates alternative horizon data according to an embodiment of the inventive concepts disclosed herein.

In environments where the horizon 240 is expected to be irregular, such as where rotorwing aircraft are flying nap of the earth, alternative horizon data 140, such as shown in FIG. 4, may be used. The horizon data 140 includes aircraft orientation data 310 and helmet tracked orientation data 320, such as in FIG. 3, but further includes topology data 430 of the earth at the longitudinal and latitudinal position of the aircraft 220, and heading data 440 indicative of the heading of the aircraft 220.

As described above with respect to FIG. 3, the processor 110 may determine the orientation of the helmet 230, and presumably the orientation of the aircraft occupant 210 wearing the helmet 230, relative to the earth, based on the helmet tracked orientation data 320, and the aircraft orientation data 310.

Returning to FIG. 4, the processor 110 then determines the shape of the horizon 190 based on the topology data 430 and the heading data 440. The topology data 430, such as synthetic visual system (SVS) data, may be from a database where the data is based on GPS coordinates for longitudinal and latitudinal position, and provides elevation data on the surface shape of the earth at those coordinates. The synthetic data will include topological features such as hills or cultural features such as buildings at the latitudinal and longitudinal coordinates.

The shape of the horizon 190 is further based on heading data 440, that is, for example, whether the aircraft 220 is headed toward or away from a topological feature.

The processor 110 may then determine the horizon 190, based on the orientation of the helmet 230, and presumably the orientation of the aircraft occupant 210 wearing the helmet 230, relative to the earth, and based on the shape of the horizon. The processor 110 then sets the sky region 180 to be the region in the image which is above the horizon 190.

Figure 5:
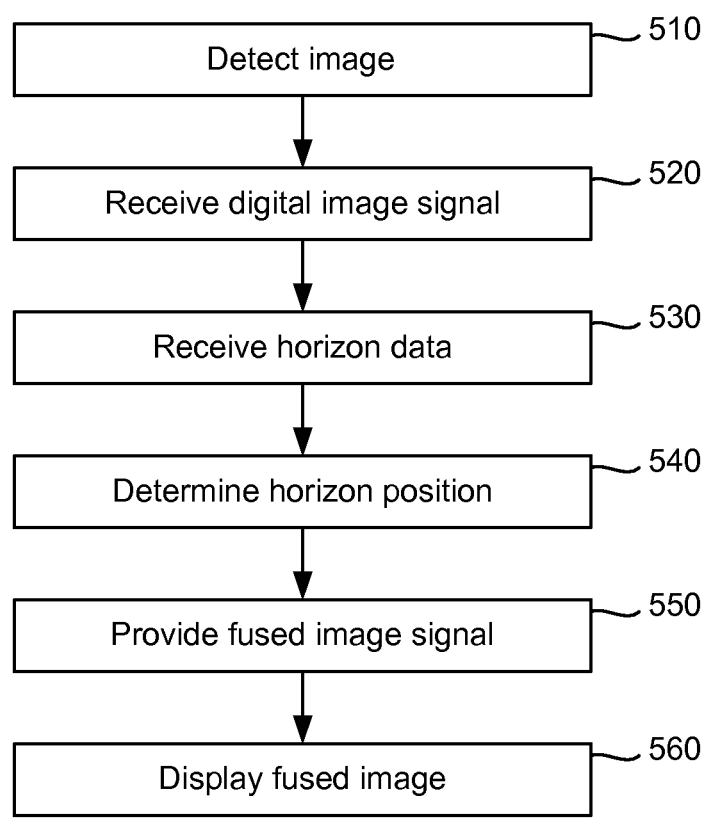
FIG. 5 is a flow chart illustrating the operation of the night vision optical system of FIG. 1 according to an embodiment of the inventive concepts disclosed herein

FIG. 5 illustrates a method of operating the night vision optical system 10 of FIG. 1 according to an embodiment.

In step 510 a detected NIR image is provided via the at least one digital image sensor channel 120. In particular, the at least one digital image sensor channel 120 detects NIR radiation emitted from the scene 17 including the objects 15. In general, the detected NIR radiation will have a spatially varying luminance level.

In step 520, the at least one processor 110 receives a digital image signal based on the spatially varying luminance level of the detected NIR image received from the at least one digital image sensor channel 120.

In step 530, the at least one processor 110 receives horizon data 140, which is separate from the digital image signal, where the horizon data 140 indicates the position of a horizon 240 where a sky 250 is above the horizon 240. For environments where the horizon 250 is expected to be substantially a straight line, the horizon data 140 may include helmet tracked orientation data 320 and aircraft orientation data 310. For environments where the horizon 140 is expected to be irregular, the horizon 240 may further include topology data 430 and heading data 440. In step 540 the at least one processor 110 determines the position of the horizon 190 based on the horizon data 140.

In step 550 the at least one processor 110 provides a fused image signal based on the received digital image signal and the determined position of the horizon 190 of the image where a sky region indicative of the sky is provided with an enhanced color fused with the varying luminance level of the detected NIR image.

In step 560 a full color display displays a fused image based on the fused image signal. The fused image is provided by fusing the enhanced color luminance L* with the luminance level of the detected NIR image on a pixel-by-pixel base.

According to inventive concepts described herein, a night vision optical system is used with processing to artificially color the night sky, but at the same time maintain the surface data, such as clouds, and other aircraft. The blue sky and the detected image from the goggles are combined at a pixel-by-pixel level, instead of merely pasting a blue sky over a region of the image. This will result in a realistic sky that provides the pilot with immediate cues as to the spatial orientation of the aircraft, but at the same time surface data is present in the view of the sky.

By coloring a sky region with an enhanced color, and fusing with the luminance levels from digital image sensor channels, a pilot may easily determine the spatial orientation of the aircraft without losing any features such as clouds, stars or other aircraft. Using this approach provides a clear unobstructed view of the world while providing the night sky cue and preventing spatial disorientation.

The embodiments of the invention have been described in detail with particular reference to preferred embodiments thereof, but it will be understood by those skilled in the art that variations and modifications can be effected within the spirit and scope of the invention.

What is claimed is:

1. A night vision optical system, comprising:
at least one digital image sensor channel configured to detect an image;
at least one processor configured to:
receive a digital image sensor signal from the at least one digital image sensor channel based on a spatially varying luminance level of the detected image;
receive horizon data, separate from the digital image sensor signal from the at least one digital image sensor channel, indicating a position of a horizon where a sky is adjacent the horizon;
determine the position of the horizon based on the received horizon data to provide a determined position, the horizon data is based on topology data of earth at a longitudinal and latitudinal position of an aircraft and based on heading data indicative of the heading of the aircraft, and
provide a fused image signal based on the received digital image sensor signal and the determined position of the horizon where a sky region indicative of the sky is provided with a fixed luminance enhanced color fused with the varying luminance level of the detected digital sensor image; and
a full color display configured to display a fused image based on the fused image signal received from the at least one processor,
wherein the full color display has an array of pixels, and wherein the at least one processor is configured to provide each pixel individually with a signal based on fusing the luminance level of the enhanced color and the luminance level of the detected image at a respective pixel.

2. The night vision optical system of claim 1, wherein the at least one digital image sensor channel comprises at least one digital NIR sensor channel.

3. The night vision optical system of claim 1, wherein the at least one digital image sensor channel comprises two digital image sensor channels, and the night vision optical system comprises night vision goggles.

4. The night vision optical system of claim 1, wherein the digital image sensor signal received from the at least one digital image sensor channel is for a monochrome image.

5. The night vision optical system of claim 1, wherein the horizon data is further based on aircraft orientation data indicating an orientation of the aircraft, and helmet tracked orientation data indicating the orientation of a helmet of an occupant with respect to the aircraft.

6. The night vision optical system of claim 1, wherein the horizon is provided as a substantially straight line.

7. The night vision optical system of claim 1, wherein the horizon is provided as an irregularly shaped line.

8. The night vision optical system of claim 1, wherein the enhanced color is blue.

9. The method of claim 8, wherein the horizon is provided as a substantially straight line.

10. The method of claim 8, wherein the horizon is provided as an irregularly shaped line.

11. A method of operating a night vision optical system, comprising:
detecting an image;
receiving a digital image signal based on a spatially varying luminance level of the detected image;
receiving horizon data, separate from the digital image signal, indicating a position of a horizon where a sky is adjacent the horizon;
determining the position of the horizon based on the received horizon data to provide a determined position, the horizon data is based on topology data of earth at a longitudinal and latitudinal position of an aircraft and based on heading data indicative of the heading of the aircraft;
providing a fused image signal based on the received digital image signal and the determined position of the horizon where a sky region indicative of the sky is provided with a fixed luminance enhanced color fused with the varying luminance level of the detected image; and
displaying on a full color display a fused image based on the fused image signal,
wherein the full color display has an array of pixels, and further comprising providing each pixel individually with a signal based on fusing the luminance level of the enhanced color and the luminance level of the detected image at a respective pixel.

12. The method of claim 11, wherein the night vision optical system comprises night vision goggles.

13. The method of claim 11, wherein the enhanced color is blue.

14. The method of claim 11, wherein the received digital image sensor signal is for a monochrome image.

15. The method of claim 11, wherein the horizon data is further based on aircraft orientation data indicating an orientation of the aircraft, and helmet tracked orientation data indicating the orientation of a helmet of an occupant with respect to the aircraft.

16. The method of claim 15, wherein the horizon is provided as an irregularly shaped line.

* * * * *